United States Patent Office 3,052,735
Patented Sept. 4, 1962

3,052,735
PREPARATION OF DIALLYLIC COMPOUNDS
Russell L. Hodgson, Concord, Calif., and John H. Raley, Amsterdam, Netherlands, assignors to Shell Oil Company, New York, N.Y., a corporation of Delaware
No Drawing. Filed Apr. 8, 1960, Ser. No. 20,803
10 Claims. (Cl. 260—654)

This invention relates to a new process for preparing polyolefinic organic compounds. More particularly, the invention relates to a process for preparing organic compounds having two allylic groups.

The preparation of diallylic compounds is of interest not only as an example of a unique reaction but also as a means of obtaining non-conjugated diolefins. The diallylic compounds are of potential use for a variety of purposes, for example, as monomers in polymerizations either alone or in admixture with other olefins. Since these compounds have two sites of reactivity, they are also useful in the preparation of difunctional compounds for use as chemical intermediates.

A great many methods for preparing organic compounds substituted with olefinic groups, such as allylic groups, have been suggested in the past, but in general such methods have not proved entirely satisfactory, particularly for large-scale operations. These methods have in the main been unattractive for large-scale operations for economical reasons. They have either been objectionable for giving too low a yield of the desired product or they have employed expensive reactants as catalysts. Thus, numerous references may be found that teach the preparation of diolefins by the reaction of an unsaturated halide with a metal. Grignard reagents have been the choice of many workers in this group. The processes described by these references are well suited only to the laboratory scale in which they have been used due to a relatively low yield of product and because of the engineering difficulties encountered in employing them in a large continuous operation.

Other attempts have been made to develop a commercial scale process using pyrolytic techniques. While these have been successful it has been found that the process to be herein described is capable of producing even greater yields of the desired product.

The preparation of diallyl itself by reacting allyl chloride with copper has been known in the art for some time. These known methods have used copper in various physical states from bulk forms to finely divided forms, including the suspension of a finely divided form in an organic diluent. While these methods have succeeded in producing the desired diallyl, they have been able only to do so in very low yields and are therefore unsuitable for a large-scale operation.

It is an object of this invention, therefore, to provide a new and improved method for preparing diallylic compounds that is economically attractive for large-scale operations. It is a further object to provide a practical and efficient method for producing and coupling two allylic radicals together to form diallylic compounds. It is a further object to provide an efficient method for preparing diallyl from allyl chloride. It is a further object to provide new and useful diallylic compounds. Other objects and advantages of the invention will be apparent from the following detailed description.

It has now been discovered that these and other objects may be accomplished by contacting monoallylic halides in vapor phase with copper carried on an inert solid support.

The process of the invention is based on the following reaction in which allyl chloride serves as a typical monoallylic halide suitable for use in this invention:

2CH$_2$=CH—CH$_2$Cl+2Cu
→ CH$_2$=CH—CH$_2$—CH$_2$—CH=CH$_2$+2CuCl

The resulting cuprous halide may then be treated with a suitable reducing agent to regenerate the copper metal for reuse with more allyl chloride.

The process of this invention is a general method for preparing diallylic compounds. By merely varying the type of allylic halide one can produce a great variety of different types of diallylic compounds, some of which have never been produced heretofore.

The expression "allylic halide," as used throughout the specification and claims, refers to those organic compounds which possess a double bond between two aliphatic carbon atoms, one of which is joined to a third aliphatic carbon atom bearing a halogen atom.

The allylic halide used in the process of this invention includes those monoallylic aliphatic halides having up to ten carbon atoms or more. Typical examples of suitable reactants are allyl chloride, allyl bromide, allyl iodide, methallyl chloride, crotyl iodide, 3-chloro-1-butene, 3-fluoro-1-pentene, 3-chloro-1-heptene, etc. Polyhalogenated allylic compounds such as 1,3-dichloropropene may similarly be used in the process of the invention. It is preferred in carrying out the process of this invention to employ monochlorine compounds.

It will be apparent to those skilled in the art that our invention will be equally applicable for the production of diallylic compounds consisting of two identical monoallylic radicals as well as diallylic compounds consisting of two different monoallylic radicals. Thus allyl chloride alone will give diallyl, while allyl chloride with methallyl chloride will also produce 2-methyl-1,5-hexadiene along with dimethallyl.

The most important mono-chlorine compound that may be used is allyl chloride, which will yield diallyl (1,5-hexadiene) when reacted alone with copper under the conditions of the invention. For this reason allyl chloride will be used to illustrate the many important features of our invention which are similarly applicable to the other allylic halides such as those previously mentioned.

According to the present invention, when an allylic halide in vapor phase is contacted with copper dispersed on an inert solid support under the appropriate temperature and supported copper to allylic halide feed ratio, surprisingly high selectives and high yields of diallylic compounds are produced to make the process economically attractive for large-scale operations. The high yields of the diallylic compound are obtained as a function of the use of the solid inert support for the copper metal. This advantageous effect of using a solid support serves as a possible explanation of why the use of unsupported copper metal with its concomitant smaller surface area is not capable of the high yields exhibited by the process of our invention.

The most important aspect of our invention is therefore the use of a solid inert support that has the requisite properties. There are many inert supports known in the art which may be satisfactorily used such as diatomaceous earth, alundum, porcelain, asbestos, charcoal, kaolin, zeolites, and the like. We have found that silica, silicon carbide, pumice, and alumina perform particularly well, and of these, silica is the most preferred.

The particular support utilized will have the requisite properties if it has the ability to hold the copper on its surface. By this we mean that the copper should adhere and be bound to some part of the support's surface and not be carried away by the flow of the allylic halide or a diluent. Movement from one part of the surface of the support to another is entirely permissible. In fact, as will be later discussed, regeneration of the copper on the support causes precisely such a movement on the support's surface and results in a better dispersion. Any inert solid support which tends to retain the copper on some part of its surface will accordingly be satisfactory. Silica, silicon carbide, pumice, and aluimna, as well as many other supports, exhibit this property to an appreciable extent and are therefore preferred. Supports which do not retain the copper as securely as the preferred supports will of course provide a far less economically attractive process since new copper must be supplied instead of regenerating the original, as will hereinafter be discussed.

Of equal importance to the use of a solid inert support that has been suitably chosen is the necessity of having the copper present on the support in a uniform film or coating. Copper that has not been properly dispersed on the support performs only slightly better than the unsupported copper of the prior art. Thus the convenient method of preparing the solid support by impregnation with aqueous cupric nitrate followed by reduction with hydrogen failed to achieve a really even distribution of the copper layer on the support and consequently was found to perform rather poorly in respect to percent yield of desired product.

Numerous methods for achieving a thorough dispersal may be employed with varying degrees of success, depending on the support used. One of these methods comprises carrying out the copper impregnation of the support with an aqueous ammonia solution. Other methods involve the use of gaseous ammonia as a pretreatment of the support or as part of a regeneration step, or pretreatment of the support with air or hydrogen. In order to achieve an even more complete dissemination so that the copper is present in as uniform a coating as possible, further treatment is advisable.

We have discovered that consistently high yields from a thorough dispersal of the copper can be attained by treating the copper on the support with an allylic halide and then regenerating the copper by one of the methods to be later described. When this is done, the supported copper will show a surprisingly marked improvement in performance. The striking effect of this treatment on the physical characteristics of the copper on the support is so pronounced that a visual comparison before and after the treatment will very readily show the improved dispersal of the copper.

The percent by weight of copper on the support appears also to have some effect on the yeld of the desired product. Thus, when the amount of copper becomes too great, part of the support is made inaccessible by the excess copper and the yield will decrease. On the other hand, too little copper also produces poor yields since too little copper is available to react. Amounts ranging from about 5% to about 45% by weight of copper on the support have led to desirably high yields of diallylic compounds. Copper on silica at about 25%–35% by weight has been found to be particularly effective, while 15%–20% copper on pumice was almost equally effective.

Temperature at which the reaction is to be conducted and the weight ratio of the supported copper to the sum of the weights of the allylic feed to be reacted with the copper are mutually dependent figures when a given yield of product is desired. Thus, to produce yields of diallyl in excess of 80% at 200° C. requires many times the weight ratio of supported copper to allylic feed that is necessary to produce the same yield at 100° C. It has also been found that lowering the temperature below 75° C. causes a reduced yield in any event since at these lower temperatures the allylic halide feed and the diallylic product are adsorbed on the solid and are removed only if the solid is heated. Therefore, the reaction should be carried out between about 75° C. to about 300° C. with the solid-to-feed ratio varying accordingly between about 5 and about 200. The preferred conditions with respect to yield and economy are found to exist at about 85° C. to about 150° C. with a solid-to-feed ratio of about 10 to 40, the most preferred conditions being a solid-to-feed ratio of about 10 to 20 at about 100° C.

The reaction may be carried out under atmospheric superatmospheric, or subatmospheric pressures. We prefer to use atmospheric pressure for convenience.

The reaction itself is quite rapid and normally extended reaction times are not required. Resident times between the copper and the allyl halide of about 1 to 10 seconds will generally prove satisfactory for most reactants.

The equipment and mode of carrying out the reaction may be varied to suit any particular purpose when taking into consideration the allyl halide to be used and the volume of production desired. We have found that the process of our invention gives uniformly high yields when carried out on a small scale in a pulse-reactor, which is a small reaction vessel fitted with a hypodermic syringe, as well as when conducted on a continuous larger scale using a fluidized fixed bed reactor or a fixed bed reactor. Depending upon the mode of carrying out the process of our invention that is selected, a diluent or stripping gas may be desirable. For this purpose such inert materials as helium, nitrogen, saturated hydrocarbons such as methane, ethane, and propane, etc., are suitable.

Regardless of the mode of conducting the reaction as the reaction proceeds the copper metal on the support will be oxidized to cuprous halide. The most economical means of supplying copper metal for reaction with more allylic halide is to regenerate the copper from the cuprous halide already present. It has been found that the copper may be satisfactorily regenerated by reacting the cuprous halide with hydrogen, or alternatively, by first reacting the cuprous halide with air to form the oxide and then reacting the resultant oxide with hydrogen to regenerate the copper metal. Hydrocarbons such as the alkanes and the alkenes have been successfully used in place of hydrogen in this last step. Other means of regeneration may be adapted if found to be more convenient.

In the two methods of regeneration that we prefer to employ, the temperatures of the hydrogen and air may be varied over a considerable range and still satisfactorily regenerate the copper. It has been found, however, that if the hydrogen is used at less than about 200° C., the reactivity of the copper is impaired. It is preferred, therefore, to use hydrogen between about 200° C. and about 600° C. Hydrogen at about 400° C. is particularly effective.

If the alternative method of producing the oxide with air followed by reduction with hydrogen is used, the regenerated copper will exhibit improved activity and is therefore preferred over regeneration with hydrogen alone. The preferred temperature of the air to be used also from about 200° C. to about 600° C. Air at about 500° C. followed by the hydrogen at about 400° C. have been found to give the best results. Residual hydrogen is not a serious problem and only a minimum stripping operation is necessary after the regeneration.

To illustrate the manner in which the invention may be carried out, the following examples are given. It is to be understood, however, that the examples are for the purpose of illustration and the invention is not to be regarded as limited to any of the specific conditions or reactants cited therein.

EXAMPLE I

A series of runs was carried out in a small pulse-reactor with the effluent gas stream fed directly to a gas-liquid chromatograph for analysis. This reactor was used with 1- to 5-gram charges of supported copper and 1- to 100-milligram pulses of allyl chloride. The feed was injected into the reactor in a single pulse by using a hypodermic syringe.

All the solids examined were prepared by impregnation of the appropriate support material with an aqueous cupric nitrate solution. The impregnated solid was partially dried and then the cupric nitrate was reduced to the metal with hydrogen.

Regeneration of the copper metal was carried out by treating the solid with air at about 500° C. and then with hydrogen at about 400° C., or when indicated, by treatment with $H_2$ only at about 400° C.

the product was confirmed by a mass spectrograph which showed the presence of $C_6H_8Cl_2$. The product is a difunctional diolefin and as such could be used for the preparation of difunctional chemical intermediates, for example, 1,2,5,6-diepoxyhexane.

EXAMPLE V

To illustrate the wide applicability of our invention to allylic halides in general, the following reactions were run as in Example I, using two grams of solid reactant comprising 25%w Cu on Davison No. 70 on 10 $SiO_2$ in a

| Solid (2-gram charges) | Temp. (° C.) | Solid treatment | Solid/feed [1] (weight ratio) | Selectivity [2] (percent) | Percent yeild of diallyl |
|---|---|---|---|---|---|
| 33% weight Cu on Davison [3] No. 62 $SiO_2$ (>70 mesh). |  | None | 29 | 75 | 30 |
|  | 150 | Treat with allyl chloride and regenerate | 30 | 83 | 83 |
| 15% weight Cu on pumice |  | None | 34 | 72 | 15 |
|  | 150 | Treat with allyl chloride and regenerate | 25 | 96 | 60 |
| 33% weight on alumina |  | Pretreat with $NH_4OH$, air, and $H_2$ | 30 | 48 | 48 |
|  | 150 | Treat with allyl chloride and regenerate, using $NH_4OH$ with the air and $H_2$. | 32 | 75 | 75 |

[1] In this and the following examples, solid/feed equals weight solid/Σ weights of feed pulses before regenerating the Cu.
[2] Percent selectivity is that portion of the total allylic reactants undergoing any type of conversion that results in the desired diallylic compound. Percent selectivity times percent conversion equals percent yield.
[3] The two types of Davison silicas used in this and the following examples had a surface area of about 300 m.$^2$/g. The other supports used had somewhat lower surface areas. Pore diameters were about 135 A.

When silicon carbide is substituted for any of the above supports, under the conditions indicated for those supports, comparable selectivities and yields of diallyl are obtained.

EXAMPLE II

In order to compare the yields obtained with unsupported copper, the following series of runs were carried out on the various forms of unsupported copper indicated in the table below, utilizing the same equipment and general procedure as in Example I.

| Solid (2-gram charges) | Temp. (° C) | Solid treatment | Solid/feed (weight ratio) | Percent yield of diallyl |
|---|---|---|---|---|
| Cu powder | 150 | Pretreat with $H_2$ | 205 | ~4 |
|  | 150 | None | 64 | ~2 |
| Cu screen (60 mesh) | 155 | Pretreat with air and $H_2$ | 215 | ~11 |
|  | 150 | None | 40 | ~3 |
| Cu shavings | 220 | Pretreat with $H_2$ | 133 | 7.1 |
|  | 210 | None | 60 | 2.2 |
|  | 280 | Treat with allyl chloride and regenerate. | 105 | 8.8 |

Percent selectivity could not be accurately determined in all cases due to the very low conversions.

EXAMPLE III

Under the same conditions as in Example I the following series of runs was made to demonstrate the relationship between temperature and the solid/feed weight ratio and their effect on the percent yield.

pulse-reactor, temperatures from 100° to 150° C., and with solid/feed weight ratios from 20 to about 200. Satisfactory yields were obtained of the indicated diallylic compound in all cases.

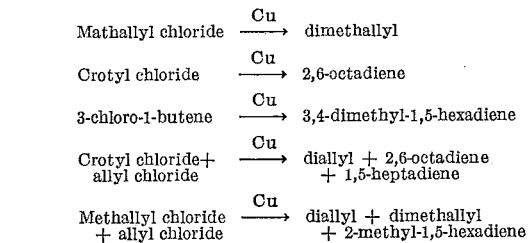

EXAMPLE VI

The process of our invention was tried in a bench-scale continuous operation. Runs were made in both a fluidized fixed-bed operation and a fixed-bed operation. 25%w Cu on Davison No. 62 $SiO_2$ (>70 mesh) was used in the fluidized system while 25%w Cu on Davison No. 70 on 10 $SiO_2$ (>14 mesh) was used in the fixed-bed operation. 350–500 grams of solid were used in the reactor. A helium diluent at the rate of 3 liters/minute was used in both cases. While operating at about 100° C. and a solid/feed ratio of about 15–20, the average results were comparable to those obtained with the pulse-reactor. After treating the copper with allyl chloride and regenerating, a typical run on the fluidized fixed-bed system gave a 69% yield with a selectivity of 98% of diallyl from allyl chloride, while a typical run

| Solid (2-gram charges) | Temp. (° C.) | Solid treatment | Solid/feed (weight ratio) | Selectivity (percent) | Percent yeild of diallyl |
|---|---|---|---|---|---|
| 33% weight Cu on Davison No. 62 $SiO_2$ (>70 mesh). | 250 | Treat with allyl chloride and regenerate with $H_2$ | 91 | 35 | 35 |
| 25% weight Cu on Davison No. 70 on 10 $SiO_2$ (~10 mesh). | 200 | ___do___ | 98 | 53 | 53 |
|  | 150 | ___do___ | 57 | 84 | 84 |
|  | 125 | ___do___ | 67 | 87 | 87 |
|  | 100 | Treat with allyl chloride and regenerate with air and $H_2$. | 16 | 98 | 83 |
|  | [1] 75 | Treat with allyl chloride and regenerate with $H_2$ | 13 | 93 | 82 |

[1] Solid was heated to 150° to remove the adsorbed product.

EXAMPLE IV

To illustrate the general applicability of our invention to polyhalogenated allylic compounds, 1,3-dichloropropene was run by the procedure described in Example I at 150° C. An approximately 30% yield of 1,6-dichloro-1,5-hexadiene was produced. The structure of on the fixed-bed system gave a 63% yield with a selectivity of 69% of the same product.

We claim as our invention:

1. The process for producing diallylic compounds which comprises reacting an aliphatic mono-allylic halide in vapor phase, at about 75 to about 300° C., with metallic copper in combination with a finely divided solid support material selected from the group consisting of silica, alumina, silicon carbide and pumice, in a weight ratio of said combined copper and finely divided solid support to said aliphatic mono-allylic halide in the range of from about 5:1 to about 200:1, said combination of metallic copper and finely divided support containing from about 5 to about 45% by weight of copper.

2. The process for producing diallylic compounds which comprises reacting an aliphatic mono-allylic chloride, in vapor phase, at about 75 to about 300° C., with metallic copper dispersed upon finely divided silica, in a weight ratio of said combined copper and silica to said aliphatic mono-allylic chloride of from about 5:1 to about 200:1, said combination of metallic copper and silica containing from about 5 to about 45% by weight of copper.

3. The process for the production of diallyl which comprises reacting allyl chloride in vapor phase at a temperature of from about 75 to about 300° C. with metallic copper supported upon a finely divided solid support selected from the group consisting of silica, alumina, silicon carbide and pumice, in a weight ratio of said supported metallic copper to allyl chloride in the range of from about 5:1 to about 200:1, said supported metallic copper containing from about 5 to about 45% by weight of copper.

4. The process for the production of diallyl which comprises reacting allyl chloride in the vapor phase at a temperature of from about 85 to about 150° C. with metallic copper dispersed upon finely divided silica, in a weight ratio of metallic copper and silica to allyl chloride of from about 10:1 to about 40:1, with a contact time of from about 1 to about 10 seconds, said combined metallic copper and silica containing from about 5 to about 45% by weight of metallic copper.

5. The process for producing diallyl which comprises contacting allyl chloride in vapor phase, at a temperature of from about 75 to about 300° C., with metallic copper supported upon finely divided silica, in a weight ratio of combined copper and silica to allyl chloride in the range of from about 5:1 to about 200:1, said supported copper containing from about 5 to about 45% by weight of copper, thereby reacting allyl chloride with said supported copper with the formation of reaction products comprising diallyl and copper chloride, separating said copper chloride from said reaction products, treating said separated copper chloride consecutively with air and hydrogen at a temperature of from about 200 to about 600° C., thereby converting said supported copper chloride to regenerated supported metallic copper, and recycling said regenerated supported metallic copper to said reaction.

6. The process for the production of diallyl which comprises reacting allyl chloride in the vapor phase at about 85 to about 150° C. with metallic copper supported upon finely divided silica, in a weight ratio of said supported copper to said allyl chloride of from about 10:1 to about 40:1, with a contact time of from about 1 to about 10 seconds, said supported metallic copper having been pretreated by contact with allyl chloride at about 75 to about 300° C. followed by contact with hydrogen at about 200 to about 600° C.

7. The process for the production of 1,6-dichloro-1,5-hexadiene which comprises reacting 1,3-dichloropropene in the vapor phase at a temperature of from about 75 to about 300° C. with metallic copper supported upon finely divided inert solid support material selected from the group consisting of silica, alumina, silicon carbide and pumice, in a weight ratio of said supported copper to said 1,3-dichloropropene in the range of from about 5:1 to about 200:1.

8. The process for preparing diallylic compounds which comprises reacting an aliphatic monoallylic halide in the vapor phase at about 75 to about 300° C., with metallic copper supported on particles of inert support material selected from the group consisting of silica, alumina, silicon carbide, and pumice, in a weight ratio of said supported copper to said aliphatic monoallylic halide in the range of from about 5:1 to about 200:1, thereby reacting said aliphatic monoallylic halide with said supported copper with the formation of reaction products comprising diallylic compounds and supported copper halide, separating said supported copper halide from said reaction products, treating said separated supported copper halide with air followed by hydrogen at a temperature of from about 200 to about 600° C., thereby converting said supported copper halide to regenerated supported metallic copper, and recycling said regenerated supported metallic copper to said reaction.

9. The process in accordance with claim 8 wherein said supported copper halide is converted to supported metallic copper by direct contact with a hydrogen gas at a temperature of from about 200 to about 600° C.

10. The compound 1,6-dichloro-1,5-hexadiene.

References Cited in the file of this patent

UNITED STATES PATENTS

| | | |
|---|---|---|
| 2,207,613 | Coleman et al. | July 9, 1940 |
| 2,387,723 | Dreyfus | Oct. 30, 1945 |
| 2,446,475 | Hearne et al. | Aug. 3, 1948 |
| 2,658,929 | Ladd | Nov. 10, 1953 |
| 2,696,475 | Farrow | Dec. 7, 1954 |
| 2,755,322 | Rust et al. | July 17, 1956 |
| 2,847,475 | Voge et al. | Aug. 12, 1958 |
| 2,991,316 | Disselnkotter | July 4, 1961 |